Patented Dec. 26, 1944

2,365,674

UNITED STATES PATENT OFFICE 2,365,674

METHOD OF PRESERVING FRUIT AND VEGETABLE JUICES

Nathaniel M. H. Blumenkranz, Peekskill, N. Y.

No Drawing. Application February 14, 1940,
Serial No. 318,830

3 Claims. (Cl. 99—155)

This invention relates to the preservation of fruit and vegetable juices and is a continuation in part of my copending application Serial No. 286,563, filed July 26, 1939.

The object of the invention is to provide a new and improved method of treating fruit and vegetable juices to preserve their natural flavor, aroma, and homogeneous qualities while restraining deleterious changes in the juice structure resulting in rancidity or "flatness" of the juice.

It is well known that fruit and vegetable juices, such as citrus fruit juices, apple juice, pineapple juice, tomato juice, carrot juice, etc., are unstable and rapidly become flat or rancid, particularly when exposed to light; and many juices such as citrus fruit juices rapidly separate or stratify into an upper water layer and a lower concentrated layer even after the juice is passed through fine screens to remove solid matter therefrom.

Numerous attempts have been made to preserve fruit and vegetable juices in their natural state, or at least to retard their deterioration as long as possible, as by packaging the juices in special containers designed to exclude all light or certain light rays thought to be injurious, as well as by special systems of daily deliveries of fruit and vegetable juices to consumers with a view to insuring freshness of supply; but all such attempts to preserve the natural flavor, aroma and body of freshly extracted juices have failed, as is evidenced by the well known fact that all canned or bottled pineapple juice, orange juice, grapefruit juice, tomato juice, etc. taste entirely different from the freshly extracted product.

I have now discovered that the deleterious effects of light rays upon fruit and vegetable juices is instantaneous, or practically so, and that once the juice is exposed to ordinary light, certain chemical changes are initiated which cause rapid deterioration in spite of any precautionary measures which are subsequently taken to package or otherwise preserve the juice in its natural state. In other words, whereas it has heretofore been thought that fruit and vegetable juices were damaged by protracted periods of exposure to light, and that the longer the exposure the greater the damage, I have discovered that the damaging effect of light upon fruit and vegetables is practically instantaneous and that even a momentary exposure to light is sufficient to spoil the juice and cause it to become flat and lose its aroma.

This can easily be demonstrated, for example by extracting the juice of an orange in the daylight and then placing it in a refrigerator or any other darkened enclosure overnight; even though the juice, so extracted in the daylight, is instantly placed in the darkened enclosure, it will be found after removal in the morning that the juice has stratified and very noticeably deteriorated in flavor and aroma. The same test can readily be made with other fruit and vegetable juices, with similar results. However, I discovered, first by experimenting with citrus fruit juices and later with various other fruit and vegetable juices, that if the juice is extracted from the fruits or vegetables in complete darkness, or in the presence of light waves longer than 4900 Angstrom units while excluding light waves shorter than 4900 Angstrom units, and stored in containers which exclude light waves below 4900 Angstrom units, the juice will retain its natural flavor, aroma and body for indefinite periods of time.

Upon making the foregoing discovery I sought to determine whether the extraction of the juices from the produce in the presence of light rays above 4900 Angstrom units of the spectrum was actually beneficial to the juice, or whether the remarkable retention of the natural flavor and aroma of the juice resulted rather from the exclusion of all waves of light below 4900 Angstrom units. I have now determined that the essential feature of my invention is the extraction and packaging of fruit and vegetable juices in the complete absence of light waves below 4900 Angstrom units, that is, light waves in the green, blue, violet and ultra-violet bands, and that if this condition is rigorously adhered to the extraction and packaging of the juices may be performed equally well either in complete darkness or in the presence of light waves in the orange, red and yellow bands which are of wave lengths above 4900 Angstrom units.

In carrying out my invention it is therefore possible to extract and package fruit and vegetable juices in absolute darkness, for example by means of an automatic juice extracting machine which is suitably enclosed and therefore works entirely in the dark; but for most purposes I have found this impractical since it is usually desirable to perform the extracting and packaging operations in the open where they can be observed and regulated as required, and I therefore prefer to carrying out the invention in a closed room which is illuminated only by light rays above 4900 Angstrom units, which can be accomplished in any suitable manner as by using a light filter which excludes all waves of light below 4900 Angstrom units. Under these conditions the juice is extracted and then sealed in cans, opaque jars or transparent or translucent containers which are colored to exclude light waves below 4900 Angstrom units, after which the sealed containers are preferably pasteurized.

As an example of my process, juices are pressed out of oranges or other fruits or vegetables in an enclosed room or chamber illuminated only by light waves above 4900 Angstrom units, for example I have used light waves of 4900 to 8000 Angstrom units and sometimes only in the band of 6000 to 8000 Angstrom units, all with excellent results. Then, while still excluding all light waves below 4900 Angstrom units, the juice is sealed in cans or enclosed in either small or bulk containers, and preferably pasteurized. After being pasteurized, or as an alternative to pasteurization, the juice may be maintained at a relatively low temperature, preferably above the freezing point and below 70° F. for a period of 15 hours or more. The principal advantage of such temperature treatments appears to be that they inhibit fermentation.

The preferred method of packaging fruit and vegetable juices extracted in the above manner will depend upon the manner in which the juices are to be marketed and used. For ordinary distribution in retail stores and the like the juices are preferably sealed in cans which in their very nature exclude all light rays from the contents until opened by the consumer. However, any container which excludes light waves below 4900 Angstrom units is equally suitable for this purpose. In other cases, however, the juices may be stored and shipped in large bulk containers which exclude light waves below 4900 Angstrom units, and then distributed in any suitable retail containers, even ordinary glass bottles if it is known that the contents are to be consumed shortly after delivery. The essential feature of the invention, regardless of the method of shipment or distribution, is the exclusion from the juice of all light waves below 4900 Angstrom units from the time the juice is extracted from the fruit or vegetable until about the time that the juice is to be consumed. The access to the juice of light waves below 4900 Angstrom units instantly activates the enzymes in the juice which produce the change in flavor, aroma, body, etc., and it is this undesirable activation of the enzymes which is prevented by my process.

By reason of my invention, orange juice and other fruit and vegetable juices may be collected in bulk at the seasons when the various fruits and vegetables are most plentiful and cheap, and transported as in cooled tank cars or bulk containers of smaller size and stored for use at a future time. By using retail tins or other containers colored to exclude light waves below 4900 Angstrom units, orange juice as well as other juices may be handled in the same manner that milk is handled after it leaves the bottling plant and is transported and delivered to the consumer, and this with no deterioration in the flavor, aroma or other natural properties of the juice.

The invention claimed is:

1. A method of preserving fruit and vegetable juices which comprises extracting the juice from the produce while excluding all light from the juice, and, while continuously excluding all light from the juice, enclosing said juice in a container which excludes all light therefrom.

2. Method of preserving fruit and vegetable juices which comprises extracting the juice from the produce while excluding from the juice all light waves below 4900 Angstroms and above 8000 Angstroms, and, while continuously excluding from the juice light waves below 4900 Angstroms and above 8000 Angstroms, enclosing said juice in a container which excludes all light waves below 4900 Angstroms.

3. Method of preserving fruit and vegetable juices which comprises extracting the juice from the produce while excluding therefrom all light waves below 4900 Angstrom units and, while continuously excluding from the extracted juice all light waves below 4900 Angstrom units, enclosing said juice in containers which exclude light waves below 4900 Angstrom units.

NATHANIEL M. H. BLUMENKRANZ.